UNITED STATES PATENT OFFICE.

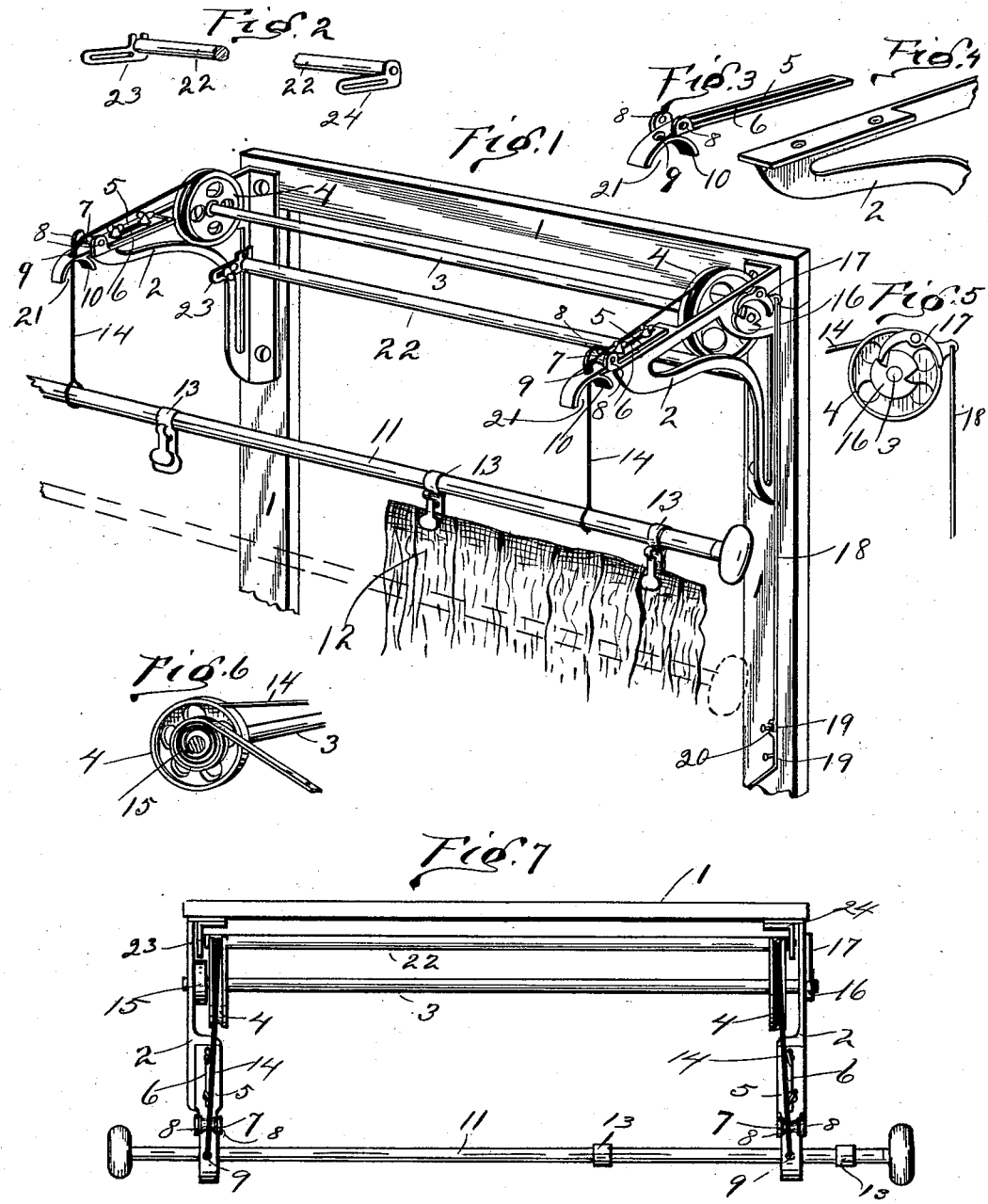
(No Model.)
T. H. LLOYD.
CURTAIN FIXTURE.
No. 588,454. Patented Aug. 17, 1897.
Witnesses
C. J. Cross
J. A. Jeffers
Inventor
Thomas H. Lloyd
By Jned W. Bond
Atty.

THOMAS H. LLOYD, OF CANTON, OHIO.

CURTAIN-FIXTURE.

SPECIFICATION forming part of Letters Patent No. 588,454, dated August 17, 1897.

Application filed June 1, 1897. Serial No. 639,067. (No model.)

*To all whom it may concern:*

Be it known that I, THOMAS H. LLOYD, a citizen of the United States, residing at Canton, in the county of Stark and State of Ohio, have invented certain new and useful Improvements in Curtain-Fixtures; and I do hereby declare that the following is a full, clear, and exact description of the same, reference being had to the annexed drawings, making a part of this specification, and to the figures of reference marked thereon, in which—

Figure 1 is a perspective view showing the upper portion of a window-frame and illustrating the different parts of the curtain-fixture connected thereto. Fig. 2 is a view showing a portion of the window-shade roller and its brackets. Fig. 3 is a detached view of one of the adjustable pole-carrying arms. Fig. 4 is a detached view showing a portion of one of the curtain-pole brackets. Fig. 5 is a side view showing one of the cord-pulleys, also showing the notched disk and detent, the bracket being removed. Fig. 6 is a perspective view showing one of the cord-pulleys and a portion of its shaft, also showing its spring. Fig. 7 is a top view of the curtain-fixture proper.

The present invention has relation to curtain-fixtures designed and calculated for holding in proper position a shade-roller and a curtain-pole, the object of the invention being to provide a means for quickly and easily lowering a curtain-pole for any purpose and elevating the same to bring it into its normal position.

Similar numbers of reference indicate corresponding parts in all the figures of the drawings.

In the accompanying drawings, 1 represents a portion of a window-frame which may be constructed in the ordinary manner and of any desired kind or style, inasmuch as the window-frame proper forms no particular part of the present invention.

To the upper portion of the window-frame are securely attached in any convenient and well-known manner the brackets 2, which brackets are substantially of the form shown in the drawings, and to which brackets is journaled the shaft 3, to which shaft are securely attached in any convenient and well-known manner the grooved cord-pulleys 4, which pulleys are preferably located as illustrated in Fig. 1. To the top or upper edges of the brackets 2 are adjustably attached the arms 5, which arms are provided with the elongated slots 6, said slots being formed so that they may be moved endwise upon the brackets 2, so as to adjust the length of the brackets proper.

To the outer end of each of the arms 5 is connected the roller 7, which rollers are properly journaled to the flanges 8 or their equivalents. Directly in front of the rollers 7 are located the apertures 9, which apertures are formed through the arms 5. The outer ends of the arms 5 are bent or curved downward, and just back of the bent or curved portions of the arm 5 are located the curved flanges 10, which curved flanges, together with the bent or curved portions of the arm 5, produce an open socket or recess to receive the curtain-pole 11, to which curtain-pole are attached curtains, such as 12, by means of the clips 13, which clips may be of the usual kind, and are connected to the pole 11 in any convenient and well-known manner.

It will be understood that the clips 13 may be dispensed with and the curtains attached direct to the pole; but I prefer to use clips to connect curtains to the pole, so that they may be easily detached. To the pole 11 are attached the cords 14, which cords extend upward through the apertures 9 and thence backward over the pulleys or rollers 7 and around the grooved pulleys 4, to which grooved pulleys the cords 14 are connected and around which pulleys the cords are given one or more wraps.

For the purpose of holding the curtain-pole in an elevated position and against the under sides of the arms 5 a spring, such as 15, is provided, one end of said spring being securely attached to the shaft 3 and the other end to one of the brackets 2 or to some other fixed object. To one end of the shaft 3 is securely attached the notched disk 16, and directly over said notched disk is located the detent or dog 17, which dog is pivotally attached to one of the brackets 2 and may be located substantially as illustrated in Fig. 1. To the detent or dog 17 is pivotally connected the top or upper end of the rod 18, which rod extends downward a sufficient distance to be easily reached for the purpose hereinafter described.

For the purpose of holding the detent 17 at any desired point of adjustment the pins 19 are provided, which pins engage the notch 20 to hold the rod 18. In use when it is desired to lower the curtain-pole 11 so as to bring it in such a position that curtains can be attached thereto the detent 17 is disengaged from the notched disk 16 by means of the rod 18, after which the curtain can be drawn downward, together with the pole 11, and when the curtain-pole 11 has been lowered a sufficient distance the detent 17 is permitted to engage the notched disk 16 and hold against the action of the spring 15. When it is desired to elevate the curtain-pole 11, together with the curtains attached thereto, the detent 17 is released, after which the spring 15 will rotate the shaft 3, together with the grooved pulleys 4, thereby winding the cords 14 around said pulleys until the curtain-pole is received into the open sockets 21, which brings the curtain-pole into its normal position.

The shade-roller 22 may be located substantially as shown in Fig. 1 and may be of the ordinary kind and is supported by means of the brackets 23 and 24, which brackets may be located substantially as shown in Fig. 1, said brackets being so attached that they may be adjusted in or out for any desired purpose.

Having fully described my invention, what I claim as new, and desire to secure by Letters Patent, is—

1. The combination of brackets 2, provided with the arms 5, carrying rollers, the shaft 3, having secured thereto the grooved pulleys 4, a spring 15, connected to the shaft, cords wrapped around the pulleys 4, and connected to the pole 11, the pole 11, carrying a curtain or curtains, substantially as and for the purpose specified.

2. The combination of brackets having journaled thereto a shaft provided with grooved pulleys, a spring to actuate the shaft, adjustable arms carrying cords connected to the grooved pulleys and to the pole 11, a notched disk secured to the shaft, and a detent to hold the shaft against rotation, substantially as and for the purpose specified.

In testimony that I claim the above I have hereunto subscribed my name in the presence of two witnesses.

THOMAS H. LLOYD.

Witnesses:
J. A. JEFFERS,
F. W. BOND.